J. P. DOYLE.
AUTOMATIC GAS SHUT-OFF.
APPLICATION FILED MAY 16, 1917.
1,270,930.
Patented July 2, 1918.
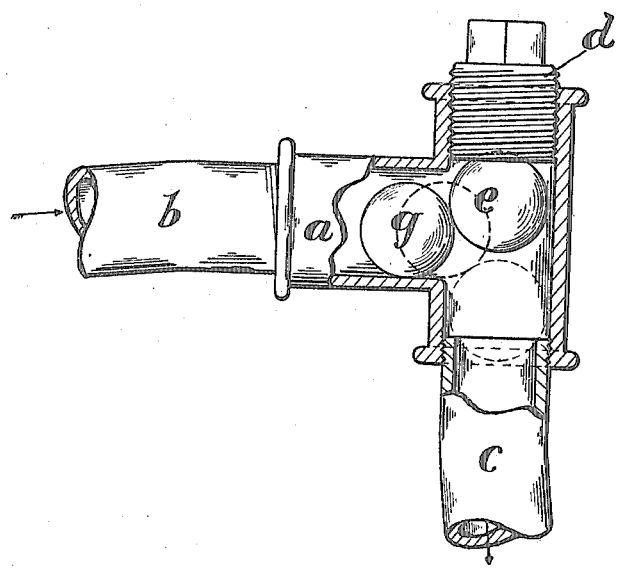
INVENTOR,
John P. Doyle,
BY
ATTORNEYS.

UNITED STATES PATENT OFFICE.

JOHN P. DOYLE, OF WELLESLEY, MASSACHUSETTS.

AUTOMATIC GAS SHUT-OFF.

1,270,930.   Specification of Letters Patent.   Patented July 2, 1918.

Application filed May 16, 1917. Serial No. 169,065.

*To all whom it may concern:*

Be it known that I, JOHN P. DOYLE, a citizen of the United States, residing at Wellesley, in the county of Norfolk, in the State of Massachusetts, have invented a certain new and useful Improvement in Automatic Gas Shut-Offs, of which the following is a specification, reference being had to the accompanying drawing.

The immediate object of this invention is to provide an exceedingly simple and inexpensive shut-off, located in the service pipe leading to the gas meter, which cut-off will be automatically operated by a low degree of heat in the event of a fire, and will serve to stop the further flow of gas into the building; thus preventing the waste of gas and rendering it easier to control the conflagration. One important feature of advantage in my said invention is in the fact that it can be made up of piping, T's, plugs etc., as now commonly used by plumbers and pipers thus avoiding the cost and delays incident to producing special parts or tools.

My invention is illustrated in the annexed drawing, which is a side elevation of a shut-off embodying my present improvement, the same being partly broken away to disclose the interior construction.

In the drawing the letter $a$ indicates a T of ordinary construction, $b$ a section of pipe leading into said T and $c$ denotes a section of pipe which, it is assumed leads to the gas meter. $d$ denotes a plug screwed into the upper end of the T $a$.

Secured to the lower end of the said plug by solder that is fusible at a low degree of heat is a ball $e$ of heavy and indestructible material, such as steel.

Normally the ball $e$ is retained in its elevated position, as in full lines by the solder but, in the event of a fire, the solder fuses and permits the ball to drop by gravity to the position shown in dotted line, that is to say, the ball drops to the upper end of the pipe $c$ and then serves as a closure to prevent the gas from entering the said pipe $c$ in any appreciable or objectionable quantity.

As a further means for preventing the displacement of ball $e$, by jarring of the pipes or otherwise, I may provide in the horizontal portion of the T a second ball $g$ which is held normally in its inoperative position by the ball $e$ but, so soon as the said ball $e$ is released from the plug $c$ and permitted to drop, the supplemental ball $g$ rolls by gravity forward to a position where it contacts with, and rests upon, the ball $c$ and thus serves to weight said ball $c$ and block it against accidental displacement.

Having thus described my invention, I claim as new and wish to secure by Letters Patent:—

The improved automatic gas shut-off consisting of an inlet pipe and an outlet pipe arranged in angular relation to each other, a ball secured normally by fusible means over the open end of the outlet pipe, and a supplemental ball adapted to block the first named ball in its closed position.

JOHN P. DOYLE.